(12) United States Patent
Kamei

(10) Patent No.: US 8,320,029 B2
(45) Date of Patent: Nov. 27, 2012

(54) IMAGE READING APPARATUS

(75) Inventor: Masafumi Kamei, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 12/791,638

(22) Filed: Jun. 1, 2010

(65) Prior Publication Data

US 2010/0309530 A1 Dec. 9, 2010

(30) Foreign Application Priority Data

Jun. 8, 2009 (JP) ................. 2009-137722

(51) Int. Cl.
*H04N 1/04* (2006.01)
(52) U.S. Cl. ......... 358/488; 358/486; 358/483; 358/497
(58) Field of Classification Search .................. 358/488, 358/486, 483, 497, 474
See application file for complete search history.

(56) References Cited

U.S. PATENT DOCUMENTS

| | | | |
|---|---|---|---|
| 5,956,087 A | 9/1999 | Takayama et al. ............ | 348/275 |
| 6,225,934 B1 | 5/2001 | Ohashi et al. ................. | 341/155 |
| 6,563,938 B1 | 5/2003 | Harada .......................... | 382/108 |
| 8,233,201 B2 * | 7/2012 | Toyoda .......................... | 358/488 |
| 2006/0170990 A1 | 8/2006 | Ishido et al. ................... | 358/498 |
| 2007/0013977 A1 | 1/2007 | Saida et al. .................... | 358/498 |
| 2010/0020366 A1 * | 1/2010 | Iwaki ............................. | 358/474 |

FOREIGN PATENT DOCUMENTS

| | | | |
|---|---|---|---|
| JP | 3337993 B2 | 8/2002 | |
| JP | 3631135 B2 | 12/2004 | |

* cited by examiner

*Primary Examiner* — Houshang Safaipour
(74) *Attorney, Agent, or Firm* — Fitzpatrick, Cella, Harper & Scinto

(57) ABSTRACT

When an original conveying unit that rotates about a rotation center 901 reaches an opening angle 906, an image is read using a line sensor, and a detected object is determined as being white dust on a platen glass. When it further reaches an opening angle 908, an image is again read using the line sensor, and a detected object is determined as being black dust on the platen glass. When it further reaches an opening angle 910, an image is again read using the line sensor, and a detected object is determined as being dust on a reference white plate with which the original conveying unit is provided in a state of facing a reading position where the line sensor performs reading.

5 Claims, 16 Drawing Sheets

FRONT SIDE 702

HINGE SIDE (ABUTMENT SIDE)

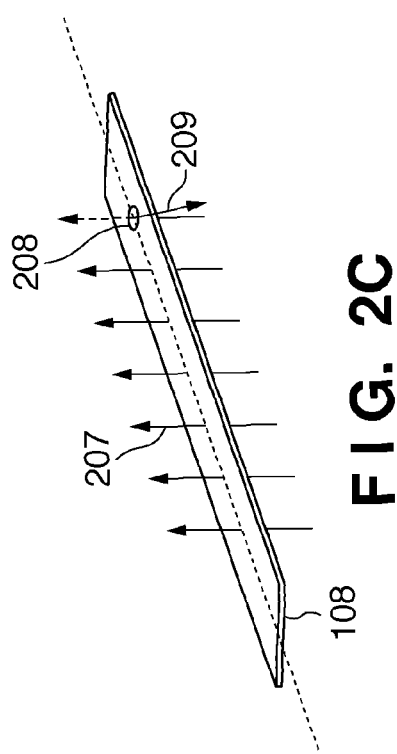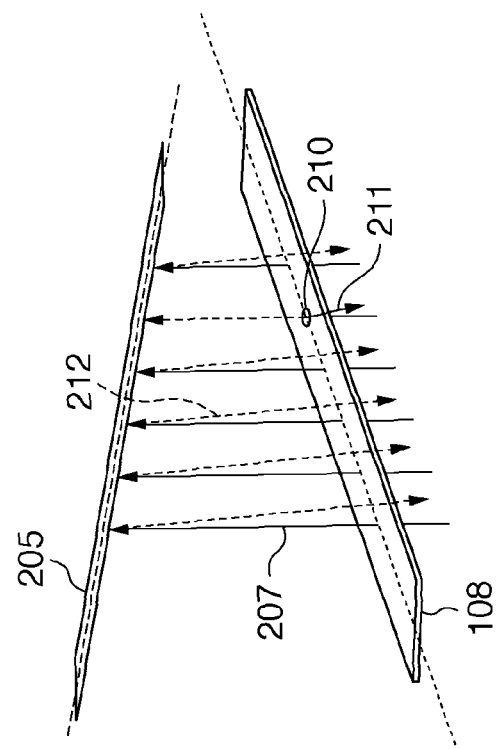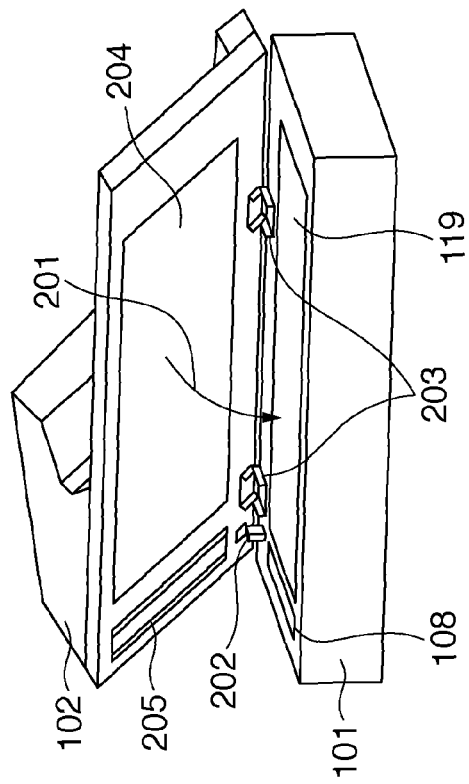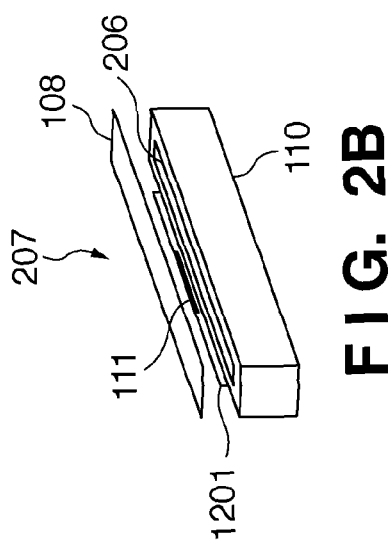

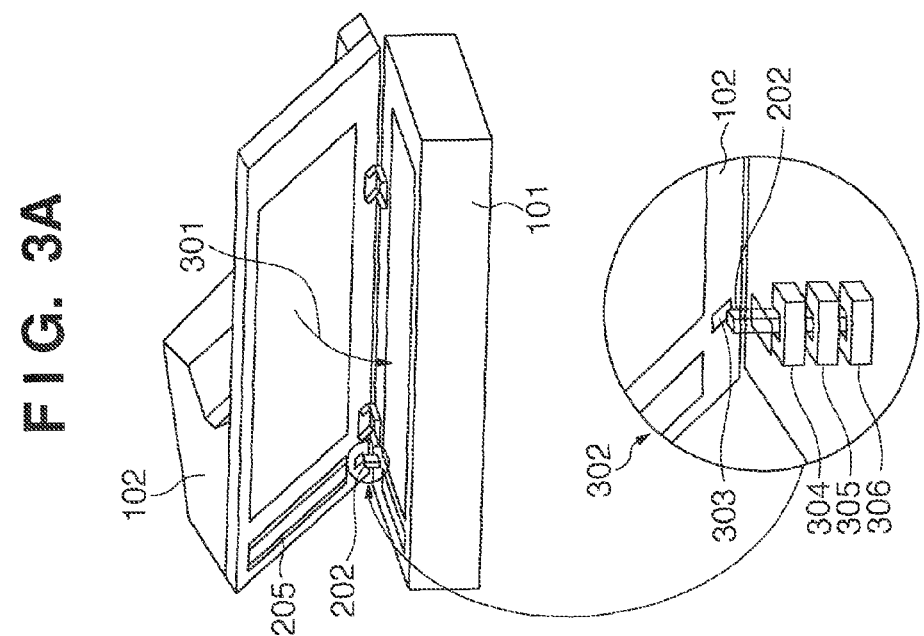
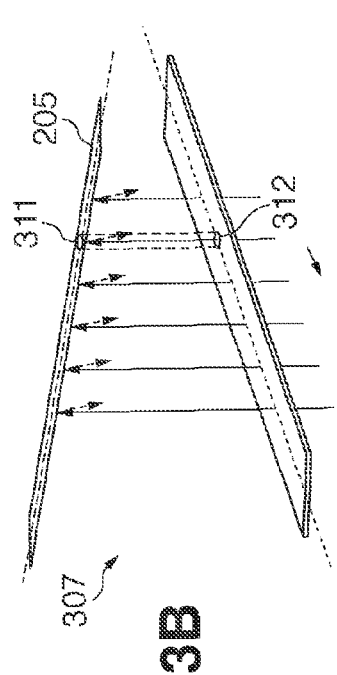
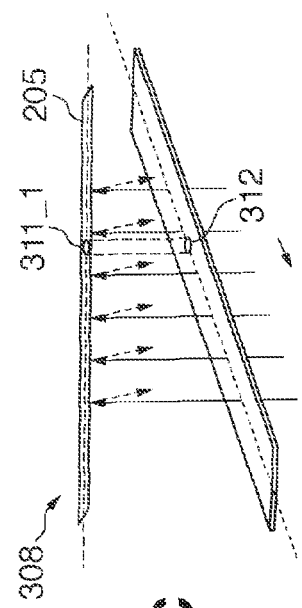
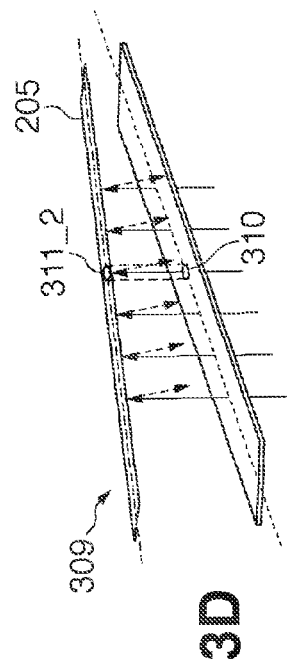

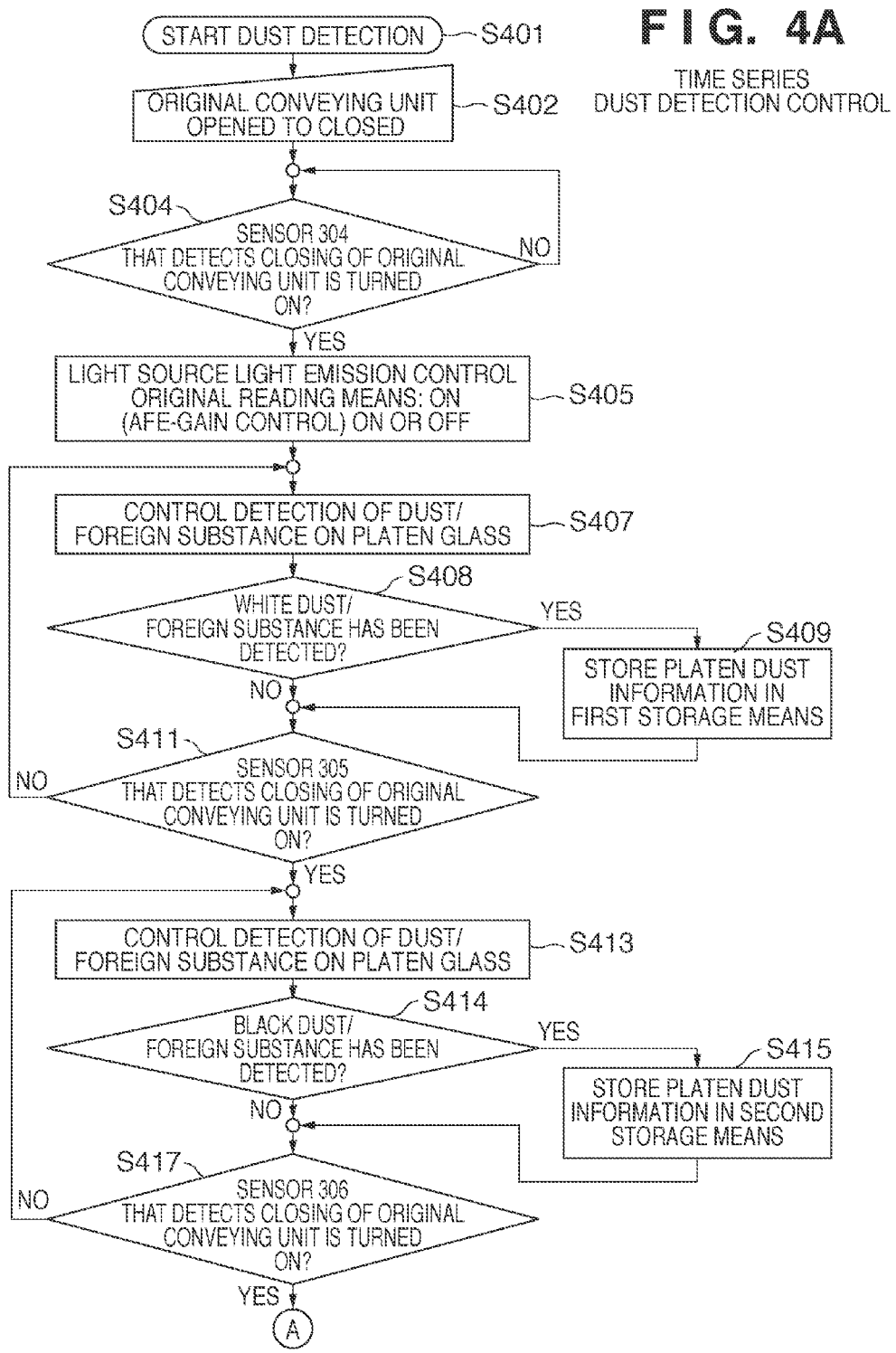

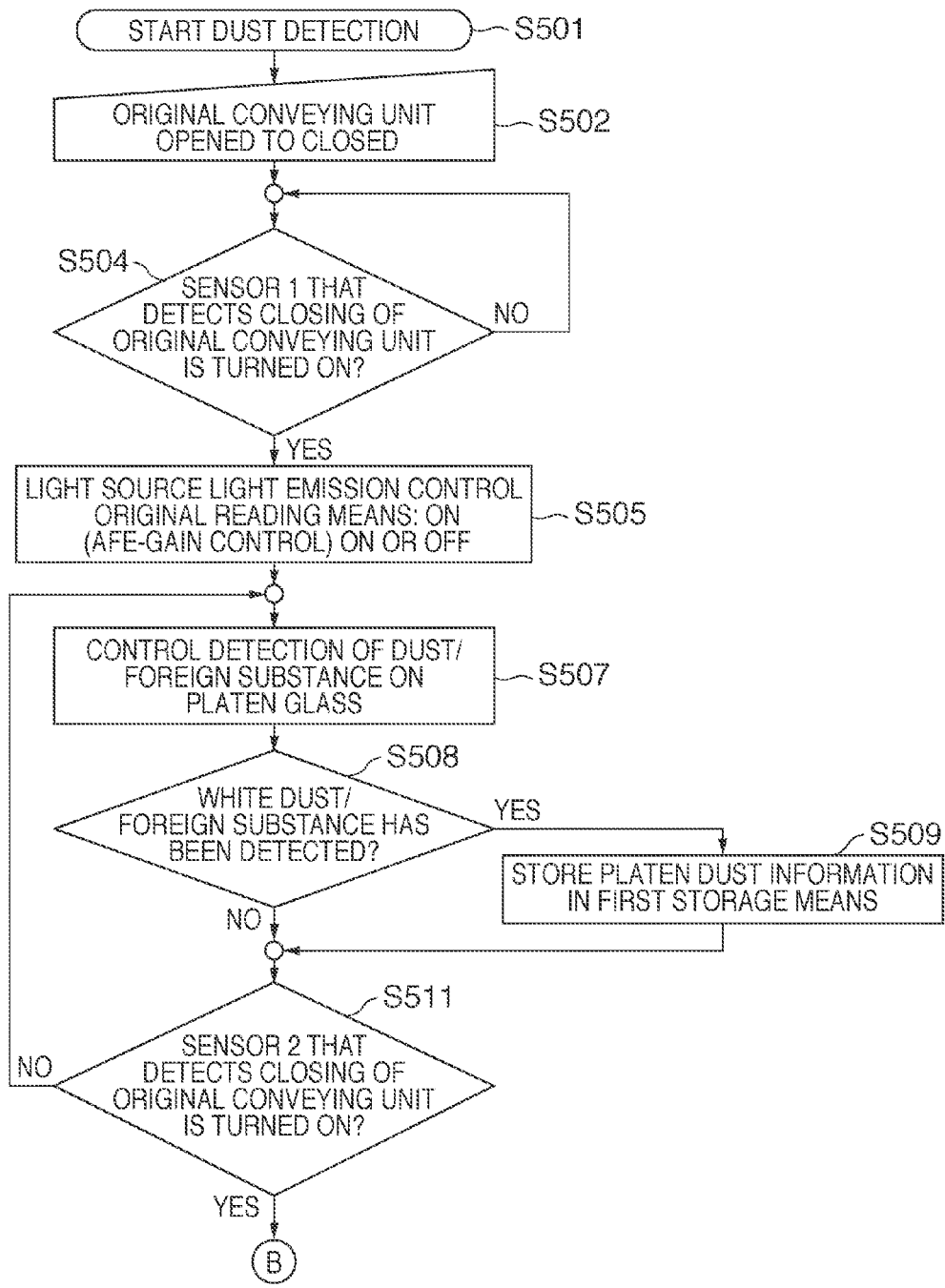

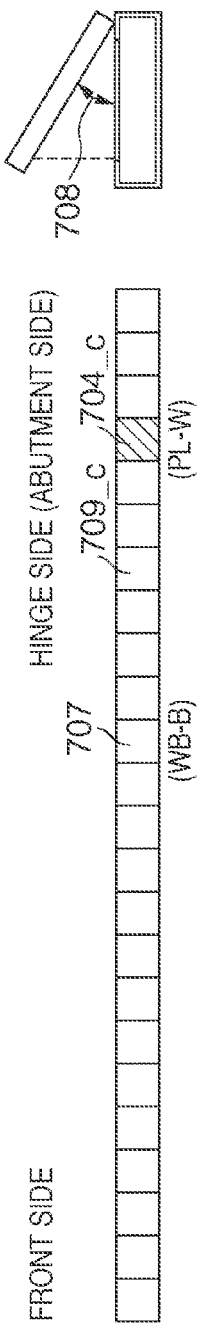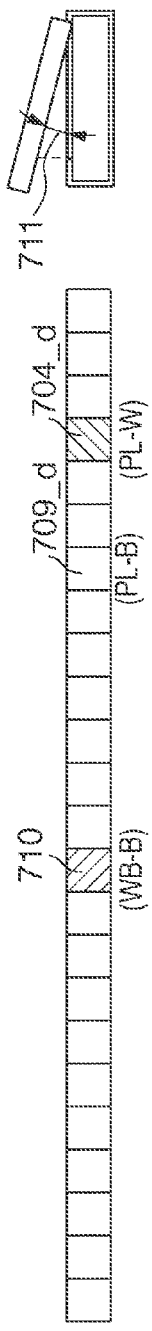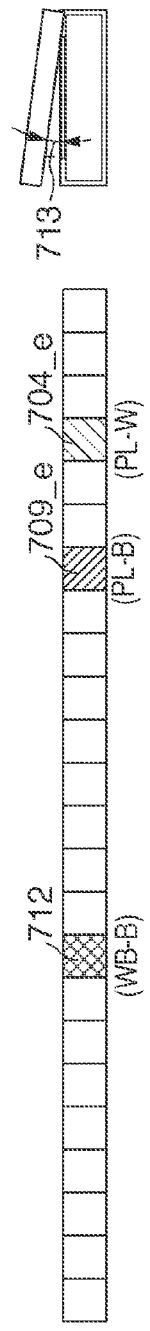

FIG. 11

| DISTANCE FROM ROTATION CENTER | DISTANCE FROM ORIGINAL ABUTMENT POSITION | DEPTH OF FIELD | $\tan \theta n$ | $\theta n$ | AMOUNT OF HORIZONTAL MOVEMENT | MOVEMENT PIXEL NUMBER |
|---|---|---|---|---|---|---|
| 172mm | 0mm | 20mm | 0.1163 | 6.63° | 1.16mm | 27.4 PIXELS |
| 175mm | 3mm | 20mm | 0.1143 | 6.52° | 1.14mm | 26.9 PIXELS |
| 180mm | 8mm | 20mm | 0.1111 | 6.34° | 1.11mm | 26.2 PIXELS |
| 190mm | 18mm | 20mm | 0.1053 | 6.01° | 1.05mm | 24.8 PIXELS |
| 200mm | 28mm | 20mm | 0.1000 | 5.71° | 1.00mm | 23.6 PIXELS |
| 210mm | 38mm | 20mm | 0.0952 | 5.44° | 0.95mm | 22.5 PIXELS |
| 220mm | 48mm | 20mm | 0.0909 | 5.19° | 0.91mm | 21.4 PIXELS |
| 230mm | 58mm | 20mm | 0.0870 | 4.97° | 0.87mm | 20.5 PIXELS |
| 240mm | 68mm | 20mm | 0.0833 | 4.76° | 0.83mm | 19.7 PIXELS |
| 250mm | 78mm | 20mm | 0.0800 | 4.57° | 0.80mm | 18.9 PIXELS |
| 260mm | 88mm | 20mm | 0.0769 | 4.40° | 0.77mm | 18.1 PIXELS |
| 270mm | 98mm | 20mm | 0.0741 | 4.24° | 0.74mm | 17.5 PIXELS |
| 280mm | 108mm | 20mm | 0.0714 | 4.09° | 0.71mm | 16.9 PIXELS |
| 290mm | 118mm | 20mm | 0.0690 | 3.95° | 0.69mm | 16.3 PIXELS |
| 300mm | 128mm | 20mm | 0.0667 | 3.81° | 0.67mm | 15.7 PIXELS |
| 310mm | 138mm | 20mm | 0.0645 | 3.69° | 0.64mm | 15.2 PIXELS |
| 320mm | 148mm | 20mm | 0.0625 | 3.58° | 0.62mm | 14.8 PIXELS |
| 330mm | 158mm | 20mm | 0.0606 | 3.47° | 0.61mm | 14.3 PIXELS |
| 340mm | 168mm | 20mm | 0.0588 | 3.37° | 0.59mm | 13.9 PIXELS |
| 350mm | 178mm | 20mm | 0.0571 | 3.27° | 0.57mm | 13.5 PIXELS |
| 360mm | 188mm | 20mm | 0.0556 | 3.18° | 0.56mm | 13.1 PIXELS |
| 370mm | 198mm | 20mm | 0.0541 | 3.09° | 0.54mm | 12.8 PIXELS |
| 380mm | 208mm | 20mm | 0.0526 | 3.01° | 0.53mm | 12.4 PIXELS |
| 390mm | 218mm | 20mm | 0.0513 | 2.94° | 0.51mm | 12.1 PIXELS |
| 400mm | 228mm | 20mm | 0.0500 | 2.86° | 0.50mm | 11.8 PIXELS |
| 410mm | 238mm | 20mm | 0.0488 | 2.79° | 0.49mm | 11.5 PIXELS |
| 420mm | 248mm | 20mm | 0.0476 | 2.73° | 0.48mm | 11.2 PIXELS |
| 430mm | 258mm | 20mm | 0.0465 | 2.66° | 0.47mm | 11.0 PIXELS |
| 440mm | 268mm | 20mm | 0.0455 | 2.60° | 0.45mm | 10.7 PIXELS |
| 450mm | 278mm | 20mm | 0.0444 | 2.54° | 0.44mm | 10.5 PIXELS |
| 460mm | 288mm | 20mm | 0.0435 | 2.49° | 0.44mm | 10.3 PIXELS |
| 470mm | 298mm | 20mm | 0.0426 | 2.44° | 0.43mm | 10.1 PIXELS |
| 480mm | 308mm | 20mm | 0.0417 | 2.39° | 0.42mm | 9.84 PIXELS |

FIG. 12

| PROCESS SPEED (mm/sec) | TIME FOR SCANNING 1 LINE ($\mu$ sec) | DUST DETECTION FREQUENCY (times) |
|---|---|---|
| 100 | 423.33 | 23.6 |
| 200 | 211.67 | 47.2 |
| 300 | 141.11 | 70.9 |
| 400 | 105.83 | 94.5 |
| 500 | 84.69 | 118.1 |
| 600 | 70.56 | 141.7 |
| 700 | 60.48 | 165.4 |
| 800 | 52.92 | 189.0 |

IMAGE READING APPARATUS

BACKGROUND OF THE INVENTION

1. Field of the Invention

The present invention relates to an image reading apparatus that has optical image reading functionality, such as a FAX, a copying apparatus, or an MFT, for example. In particular, the present invention relates to an image reading apparatus that improves the influence of dust on a platen glass or a white reference plate when performing reading using an original flow reading method with which an original is scanned that is conveyed at a constant speed by an original conveying unit.

2. Description of the Related Art

Image reading apparatuses are broadly divided, based on their reading method, into apparatuses that adopt a sheet-through method, and apparatuses that adopt a fixed original reading method (moving scanner method). The sheet-through method is a method with which an image reading means provided with a line sensor, for instance, is fixed at an original reading position of a platen glass (original platen), an original carrying unit moves an original in a sub-scanning direction at a predetermined speed, and thereby an image is read. The original carrying unit is also called an ADF (auto document feeder). The fixed original reading method is a method with which an original image is read by moving an image reading means in a state where the original is fixed on a platen glass. In the case of the sheet-through method, if there is dirt at the original reading position on the platen glass, even if this is a dot-like dirt, stripe-shaped noise continuous in the sub-scanning direction occurs on the read image. In view of this, many countermeasures against this have been proposed. For example, Japanese patent No. 3337993 proposes a configuration in which a white sheet facing a reading position is read before reading an original, and if a defective image is detected, the reading position is moved, and if such an image is not detected, original reading is performed using that position as an original reading position. Further, Japanese patent No. 3631135 has proposed a configuration in which a means for detecting dust on an original platen glass is provided, and dust avoidance processing is performed in which detection of dust on the platen glass is implemented by performing idle rotation of a feed belt during a period in which an original is not read, and a flow reading position is changed to a position where there is no dust. Furthermore, Japanese patent No. 3631135 proposes an image reading apparatus that detects the existence of dust on the original platen, forbids a reading operation using the sheet-through method according to the detection result, and allows a fixed original reading operation to be performed.

The configuration disclosed in Japanese patent No. 3631135 in which a belt or a roller is used for the rear side requires higher cost compared to that of the configuration disclosed in Japanese patent No. 3337993 in which a white sheet (white plate) is used. In view of this, a configuration in which a white plate is used is desirable in terms of cost; however, there are some problems with regard to countermeasures if a white plate is used.

A first problem is that soiling of a white plate appears as noise of image data, and it is difficult to remove this noise. In the configuration disclosed in Japanese patent No. 3631135, dust detection is implemented by performing idle rotation of the belt that is facing an original reading unit, and thus it is possible to distinguish between dust on the platen glass and dust on the belt. However, with the invention disclosed in Japanese patent No. 3337993 in which a white sheet is used as the rear side, it is not possible to distinguish between dust on the platen glass and dust on the white plate. With the sheet-through method, a white roller or a white plate arranged at the reading position on the platen glass is read before performing reading and between reading one original and another original, and a shading correction coefficient is determined using the white roller or white plate as a reference. Then, shading correction is performed with respect to image data of the read original. Shading correction is performed in order to correct variations of sensor output (luminance) in the main scanning direction due to the light quantity distribution of a light source, for instance, assuming that the white plate or white roller used as a reference is uniformly white. Accordingly, if the white plate or white roller used as a reference is soiled with dust or the like, a correction coefficient for correcting change in the luminance at the dust position is created. If shading correction is performed on image data obtained by reading an original image using the correction coefficient, a pixel corresponding to the position of the soiling on the main scanning line of the image appears on the original image as linear noise that extends in the sub-scanning direction. In the case of using a white roller, if the dust is very small, by reading an image while rotating the white roller, the sensor output at the position where dust adheres and the output for the portion where dust does not adhere are averaged, and therefore the dust is not very conspicuous, and also is not conspicuous as noise of the read image data. However, if a white plate is used, soiling such as dust on the white plate is read as is, and thus it appears as obvious noise.

Further, a second problem is that if the darkness of soiling such as dust is low, and the soiling is close to white, the difference of a reading darkness level relative to the belt or the roller on the back is small, and thus such soiling is difficult to be distinguished. White dust cannot be distinguished as to whether it is a part of an original image or dust, and thus even dust is scanned as if it is a part of the original image, and thereby a white stripe occurs on the read image. Further, since it is difficult to distinguish whether white dust is dust adhering to the platen glass or dust adhering to the white roller or white plate, there is also a problem that it is difficult to select correction processing for reducing or eliminating its influence.

SUMMARY OF THE INVENTION

The present invention has been conceived in light of the above conventional examples, and provides an image reading apparatus, particularly an image reading apparatus that adopts a configuration in which the sheet-through method with the use of a white plate is adopted, that discerns and detects black dust and white dust on a platen glass, and dust on a white plate, and can correct noise due to various types of detected dust, and a method for correcting image data.

The present invention is provided with the following configurations.

According to the first aspect of the present invention, an image reading apparatus that reads an original that is conveyed on a platen glass using an optical unit including a line sensor and an imaging optical system, the image reading apparatus comprises: an opening/closing member that can be opened and closed about a rotation axis that is orthogonal to a lengthwise direction of the line sensor; a white member provided on the opening/closing member, the white member facing the optical unit; and a detecting unit that detects images of a foreign substance from a plurality of images obtained by the optical unit reading the white member, the plurality of images being obtained respectively in a plurality of states where the opening/closing member is opened at a plurality of opening angles, wherein the detecting unit detects the foreign substance as a foreign substance adhering to the platen glass in a case where the images of the foreign substance detected from the plurality of images are at the same position.

According to the second aspect of the present invention, an image reading apparatus that reads an original that is conveyed on a platen glass using an optical unit including a line sensor and an imaging optical system, the image reading apparatus comprising: an opening/closing member that can be opened and closed about a rotation axis that is orthogonal to a lengthwise direction of the line sensor; a white member provided on the opening/closing member, the white member facing the optical unit; and a detecting unit that detects images of a foreign substance from a plurality of images obtained by the optical unit reading the white member, the plurality of images being obtained respectively in a plurality of states where the opening/closing member is opened at a plurality of opening angles, wherein the detecting unit detects the foreign substance as a foreign substance adhering to the white member in a case where the images of the foreign substance detected from the plurality of images are at different positions.

According to the invention in this application, it is possible to discern and detect black dust and white dust on the platen glass, and dust on the white plate. Accordingly, processing for correcting noise due to each type of dust is performed, which contributes to the improvement in image quality.

Further features of the present invention will become apparent from the following description of exemplary embodiments with reference to the attached drawings.

BRIEF DESCRIPTION OF THE DRAWINGS

FIGS. 2A, 2B, 2C, and 2D are diagrams illustrating essential points of an embodiment of the present invention.

FIGS. 3A, 3B, 3C, and 3D are diagrams illustrating a method for discerning dust on a white plate.

FIGS. 4A and 4B are flowcharts 1 for dust detection.

FIGS. 5A and 5B are flowcharts 2 for dust detection.

FIGS. 7A to 7H are diagrams illustrating a method for detecting dust in a storage means.

FIG. 11 shows a table that illustrates the amount of movement of dust detected at the upper limit of the depth of field at intervals of 10 mm.

FIG. 12 shows a table that illustrates the number of times that dust on the white plate is detected for each conveying speeds.

DESCRIPTION OF THE EMBODIMENTS

Embodiment 1

Figure 1:
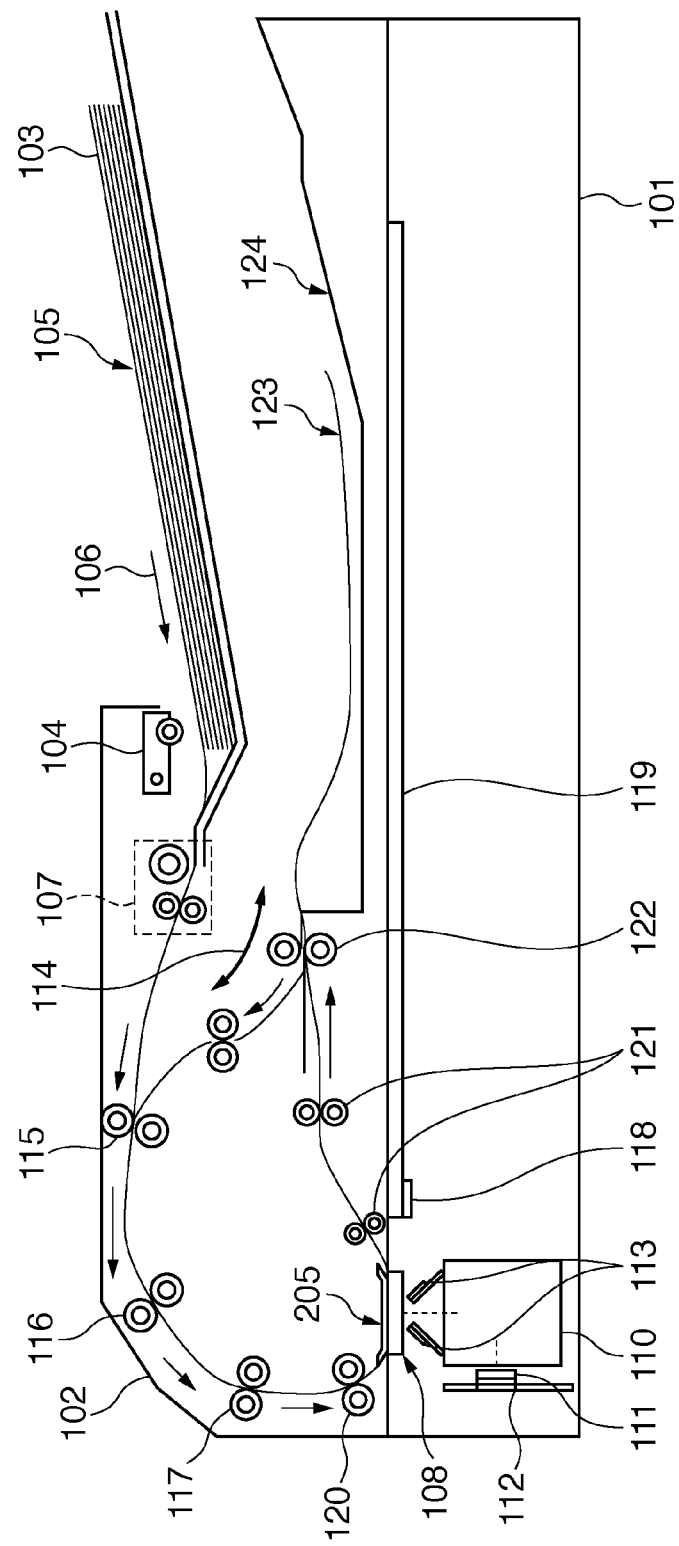
FIG. 1 is a diagram illustrating an image reading apparatus.

Structure of Image Reading Apparatus Below, an embodiment of the present invention is described in detail with reference to the attached drawings. FIG. 1 is a cross-sectional view of an image reading apparatus that uses two reading methods, namely an original fixed method and a sheet-through method. Note that reading of an original using the sheet-through method is also called "original flow reading".

An image reading apparatus 101 is provided with an original conveying (feeding) unit 102. Originals 103 are set in the original conveying unit 102. The image reading apparatus 101 starts reading an original using an original reading method that is selected via a control means (not shown), in response to a copy button (not shown) being pressed. First, a pickup roller 104 that is controlled by a paper feed motor 619 of the original conveying unit 102 is lowered automatically. Next, a separating/conveying unit 107 starts conveying an original 105, which is the top sheet of the stacked originals 103 (the original stacked on top of the set originals), in a conveyance direction 106. In FIG. 1, originals are sequentially conveyed following the arrow via conveying rollers 115, rollers 116 and 117, and pre-registration rollers 120 that are controlled by a conveying motor 620. The original is conveyed at a constant speed by the pre-registration rollers 120 controlled by a leading motor to a reading position on a platen glass (flow reading glass) 108 set on the image reading apparatus 101 that reads an original image (original surface). At this reading position, an original is illuminated by LED array light sources 113 via the platen glass 108, and light reflected from the original is formed into an image on a line sensor 111 that is mounted on a board 112, via an optical box 110. The line sensor is constituted from a CCD or the like, and the original image on the platen glass is formed on the CCD by an imaging optical system such as a lens. Then, the image is read at a resolution depending on the element density, converted into digital image data, and output. Note that the optical box 110 may be called "one-box optical unit", together with the line sensor 111, the board 112, and the LED array light sources 113.

Ordinarily, before reading an original image using a line sensor, an adjustment for correcting the reading characteristics of an original reading apparatus so that they become flat is performed, which is called shading correction. Since shading correction is a general technique for apparatuses that use devices such as a line sensor, a detailed description thereof is omitted. A brief description is as follows. Before image reading starts, the optical unit 110 is moved under a shading plate (white reference plate, white plate) 118, which is set at the edge on the inner side of a platen glass (original platen glass) 119, and reads the shading plate 118. Thereby, a correction coefficient for correcting the values obtained by reading the shading plate 118 so that they become flat is calculated. By performing shading correction using this correction coefficient, the light distribution spots of the light emitted from the original illumination means 113, influence of decrease in the amount of light at the edge on a reduction optical unit (not shown) constituted inside the optical unit 110, the sensitivity spots of the line sensor 111, and the like are corrected. Then, when reading an original, shading correction is performed on the image data using the correction coefficient. Note that it is sufficient if the shading plate is a white member used as a reference, and the shading plate can also be called a white member.

After the image of the original is read, originals 123 are discharged on a paper discharge tray 124 one by one, via rollers 121 and paper discharge/reverse rollers 122 controlled by a paper discharge/reverse motor. Further, in the case of reading an image on the back surface of the original, just before discharge of the original 123 is complete, control is performed using the paper discharge/reverse rollers 122 such that the conveyance direction is reversed, the front and back of the original are reversed using an inversion path 114, and the original is again caused to follow a reading course. Thereby, it is possible to read the image on the back. Note that in the present embodiment, a white plate 205 for dust detection is provided at a position where the white plate faces the platen glass 108 on a paper conveying path of an original feeding unit (opening/closing member). Here dust is used as a general term for foreign substances, and for example, spots made of ink, for instance, are also called dust in this example.

In the case of using a book original (a book or the like) as an original, an operator opens the original conveying unit 102, sets a book original on the platen glass 119, selects original reading control via a control means (not shown), and presses a copy button (not shown, either). By performing this operation, the original reading apparatus automatically moves the optical unit 110 to a reading position where the shading plate 118 is read, and calculates a shading correction coefficient. Then, the optical unit 110 is once moved to the original flow reading position on the left, and thereafter the optical unit 110 is moved toward the platen glass 119, so as to scan the book original set on the platen glass 119.

Thus, in the reading using the sheet-through method, the line sensor is fixed at the position of the platen glass 108, and the original, which is conveyed by the original conveying unit that can be opened and closed about a rotation axis orthogonal to the lengthwise direction (main scanning direction) of the line sensor, is read.

Figure 10:
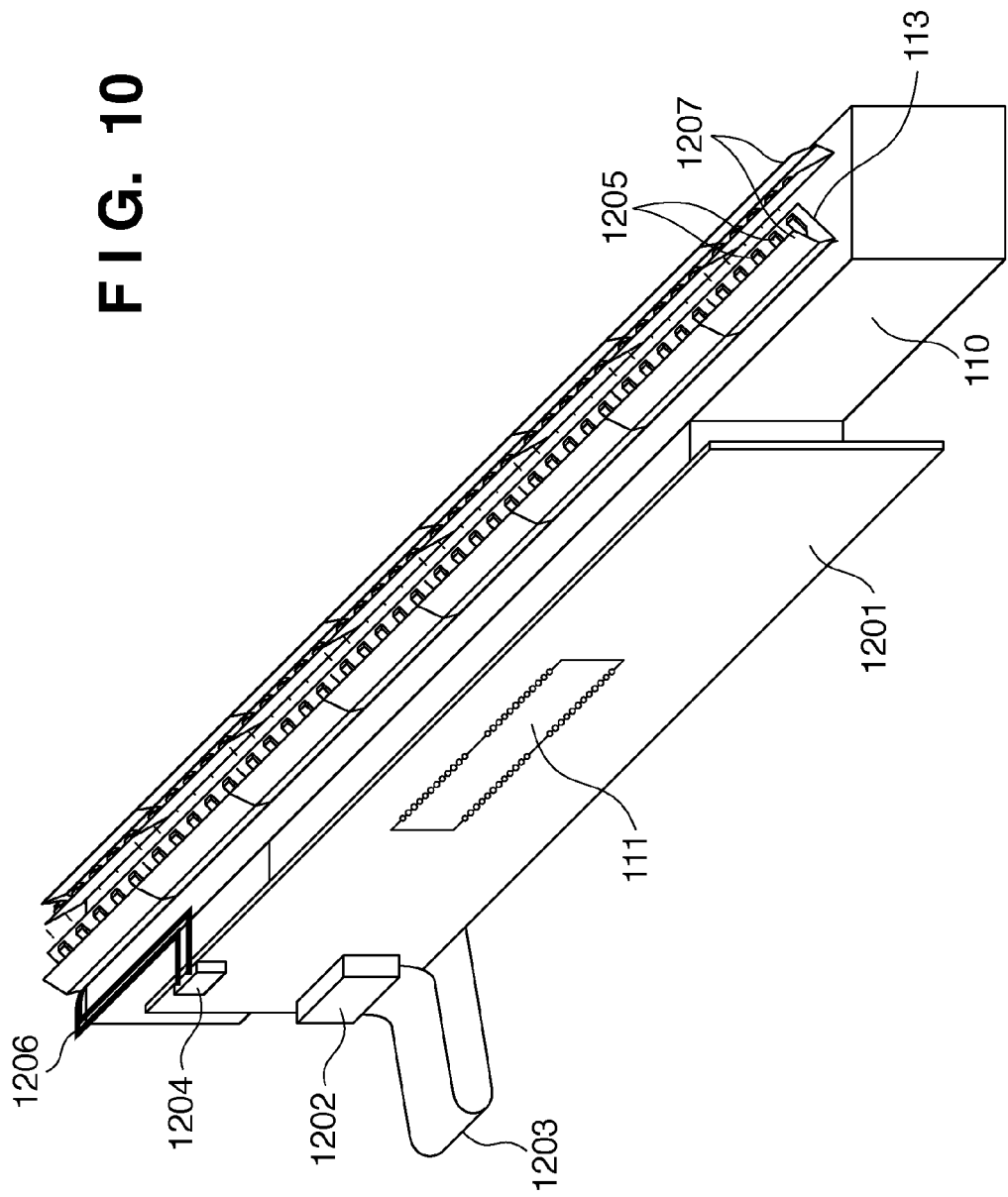
FIG. 10 is a diagram illustrating an optical unit.

Next, the configuration of the one-box optical unit 110 that has been described with reference to FIG. 1 is described in more detail with reference to FIG. 10. The line sensor 111 is mounted on a sensor board 1201. Here, in this example, the line sensor 111 is assumed to be a four line sensor that has a line sensor for monochrome reading, and RGB line sensors for color reading. The sensor board 1201 performs data communication with a controller (not shown) via a connector 1202 and a cable 1203. Also, the power consumed in the unit is supplied to the sensor board 1201. A connector 1204 supplies current on which constant current control has been performed via an electric supply line 1206 to the LED array light sources 113 constituted by a multitude of LEDs (white LEDs) 1205 arranged in the main scanning direction. Reflectors (reflecting plates) 1207 are reflecting plates that improve irradiation efficiency. The optical unit 110 has a reduction optical system that guides light reflected from the original, using an optical component (not shown), to the line sensor 111 by condensing and reflecting light reflected from the original multiple times.

The above is a description regarding an ordinary image reading apparatus that uses two types of reading methods, namely the fixed original reading method and the sheet-through method. This image reading apparatus is described in detail with reference to FIG. 2A and the following drawings.

FIG. 2A is a diagram showing the configuration of the image reading apparatus for describing the features of the present embodiment. The image reading apparatus is constituted by the original conveying unit 102 (opening/closing member) that performs an opening/closing operation with respect to the original reading apparatus 101 in the direction of an arrow 201 with hinges 203, and a means for detecting opening angles of the original conveying unit 102 in accordance with the opening/closing operation at a plurality of levels. An opening/closing lever 202 includes a means for enabling detection of opening angles at a plurality of levels according to the pushing amount of the opening/closing lever. The opening/closing lever 202 is constituted such that opening angles can be detected by pressure plate sensors 304, 305, and 306 that are constituted by optical sensors, as shown in an enlarged view 302 in FIG. 3A, for example. A pushing portion 303 presses the opening/closing lever 202 that detects the angle of the original conveying unit, when the original conveying unit is closed. The opening/closing lever 202 is used for starting and switching dust detection control. The optical unit 110 is provided with a slit 206 for incident light that limits light reflected from the original as shown in FIG. 2B, and light from directions other than the assumed direction is suppressed from entering the line sensor 111. This configuration is also for preventing dust from entering.

With the arrangement of the pressure plate sensors 304, 305, and 306 and the shape of the pushing portion 303 that comes into contact with the opening/closing lever 202, sensor detection of the amount of movement of the opening/closing lever 202 is performed when the original conveying unit 102 is closed. Thereby, an approximate opening angle of the original conveying unit 102 can be detected. For example, if the closing of the original conveying unit starts from the state where it is opened as far as the mechanism permits, the pressure plate sensor 304 detects the opening/closing lever 202 first. If the original conveying unit is further closed, the pressure plate sensor 305 also detects the opening/closing lever 202, and if it is further closed, the pressure plate sensor 306 also detects the opening/closing lever 202. With this configuration, it is possible to determine the degree of opening of the original conveying unit 102, that is, how much it is closed. Note that although three pressure plate sensors, namely the pressure plate sensors 304 to 306, are provided here, it is possible to provide more pressure plate sensors, or detect the degree of opening at further more levels using an encoder or the like.

Note that in FIGS. 2A to 2D, an original conveying unit pressure plate portion 204 pushes a book original against the platen glass 119 with constant pressure.

If the opening/closing lever 202 and the pressure plate sensors detect the start of closing the original conveying unit 102, control of the driving of the line sensor 111, control of the starting of an AFE-IC (not shown) mounted on the sensor board 1201, and control of light emission of the original illumination means 113 are executed. AFE-IC is an abbreviation for Analog Front End-Integrated Circuit, which is an analog signal processing circuit. As shown in FIG. 2C, an original or the white plate 205 is irradiated with beams of light 207 of the irradiation light from the original illumination means via the platen glass 108.

Detection of White Dust on Platen Glass

Next, an example of detection of white dust on the platen glass 108 is described. Although "dust" is used in the present embodiment, this refers to anything that appears on an image as an object that is not in the original, such as dirt adhering to or a flaw of the platen glass that should actually be transparent.

If the pressure plate sensor 304 detects the start of closing the original conveying unit, according to the detection, control of the driving of the line sensor 111, control of the starting of the AFE-IC (not shown) mounted on the sensor board 1201, and control of light emission of the original illumination means 113 are executed. Specifically, if the original conveying unit is opened at a first opening angle, it is determined as the start of closing the original conveying unit. As shown in FIG. 2C, if white dust 208 is on the main scanning line of the platen glass 108, the beam of light 207 that has passed through the platen glass 108 is reflected by the white dust 208, reflected light 209 is returned to the optical unit 110, and the reflected light is detected by the line sensor 111. This detection is performed in the state where the original conveying unit is not completely closed, so that there is sufficient space above the platen glass. Accordingly, if there is no dust, almost no reflected light is detected by the line sensor, and thus the detected luminance level will be extremely low. Accordingly, by a processing circuit (not shown) processing an output signal from the line sensor 111 in this state, an image (object) of white dust can be detected, and the position of the pixel in which the dust is present can be detected. That is, since reflected light is detected by the line sensor at the position including dust, the luminance at the position will be higher than that of the other portions. Note that since black dust hardly reflects light, there is not much difference between its luminance level and that of portions including no dust, and thus its detection is difficult using this method. That is, here, white dust on the platen glass can be selectively detected. Specifically, detection of white dust on the platen glass is implemented in the state where the original conveying unit is opened to the extent that reflected light from the white plate 205 and the like provided at the reading position cannot be detected by the line sensor 111.

Detection of Black Dust on Platen Glass

If the original conveying unit is closed from that state, and the pressure plate sensor 305 detects that the original conveying unit has further been closed, the processing accordingly enters a black dust detection sequence. Specifically, if the original conveying unit is opened at a second opening angle, the processing enters a black dust detection mode. This is shown in FIG. 2D. The optical unit 110 is in the state of being able to read reflected light from the white plate 205 set on the original conveying unit 102, and the original conveying unit is not completely closed. Although reflected light 211 from black dust 210 is minute relative to the beams of light 207, since reflected light 212 from the white plate 205 is read by the line sensor 111, it is possible to detect the black dust 210 whose reading luminance level is lower than that of the surrounding portion. Further, when reading an original image, there is a problem of depth of field. Depth of field means a distance according to which an image cannot be resolved, if the image is farther away than a distance that is greater than or equal to the depth of field. In the sequence of detecting dust on the platen glass, since it is sufficient if the darkness of the white plate can be read, reading can also be practically performed in the area beyond the depth of field. Conversely speaking, detection of black dust on the platen glass is implemented in the case where the original conveying unit is closed to the extent that the luminance (or darkness) of the white plate 205 provided at the reading position can be detected.

Detection of Dust on White plate

Finally, detection of dust on the white plate 205 provided as a part of the original conveying unit 102 (opening/closing member) is described. Note that since white dust on the white plate (that is, on the white member) will not be large noise, dust to be detected will be darker than the white plate. However, if the darkness of white dust differs remarkably from that of the white plate, processing similar to that for black dust is performed.

When the pressure plate sensor 305 of the original conveying unit is turned on, the vertical distance from the abutment side (hinge side) of the original conveyance area of the platen glass 108 to the white plate 205 of the original conveying unit 102 is almost equal to the depth of field. This is because the pressure plate sensor 305 is arranged in such a manner, and thus the position of the pressure plate sensor 305 can be determined theoretically or experimentally. Specifically, if the original conveying unit is opened at a third opening angle, the processing enters a white plate dust detection mode. As the opening angle of the original conveying unit is becoming smaller from this state, the reading range within the depth of field expands from the abutment side of the original conveyance area to the front side. That is, it is possible to sequentially execute detection of dust on the white plate 205 from the hinge side. The enlarged view 302 in FIG. 3A shows the details of an area around the opening/closing lever 202. Here, the original conveying unit 102 opens and closes by performing a circular movement with the hinges 203 as the rotation center. The position where dust on the white plate is detected is a position where an image of the dust is projected so as to be orthogonal to the platen glass 108. Accordingly, the detection position of dust on the white plate 205 changes according to the opening degree of the original conveying unit 102. For example, in the state where the original conveying unit is not completely closed, the position of dust on the white plate 205 detected in the vicinity of the limit of the depth of field is different from the position of dust in the state where the original conveying unit is completely closed, that is, in the state where original reading is actually performed using the sheet-through method. In view of this, by detecting dust images a plurality of times according to the opening degrees of the original conveying unit 102, and monitoring the movement thereof, it is determined that dust that moves in accordance with the opening and closing of the original conveying unit 102 (opening/closing member) is dust on the white plate 205. Specifically, a dust image is detected from the image obtained by reading the white plate 205 in the state where the original conveying unit 102 (opening/closing member) is opened at each opening angle from among the plurality of opening angles, and if the dust images detected from a plurality of images are in different positions, it is determined that the dust is on the white plate 205. Further, it is determined that dust that does not move in accordance with the opening and closing of the original conveying unit 102 (opening/closing member) is dust on the platen glass 108. Specifically, a dust image is detected from the image obtained by reading the white plate 205 in the state where the original conveying unit 102 (opening/closing member) is opened at each opening angle from among the plurality of opening angles, and if the dust images detected from a plurality of images are in the same position, it is determined that the dust is on the platen glass 108. Dust information that indicates the position of the determined dust, for instance, is stored in a memory 610.

FIGS. 3B, 3C, and 3D show how the original conveying unit 102 is closed, so that the angle formed by the white plate 205 and the platen glass 108 is gradually becoming smaller. Further, dust 311 adhering to the white plate 205 is found at a pixel position 312 on the main scanning line in FIG. 3B. In FIG. 3C in which the opening angle has become further smaller, white plate adhesion dust 311_1 is at a pixel position 313, and in FIG. 3D, white plate adhesion dust 311_2 is shifted to a pixel position 310 in the arrow direction.

Figure 6:
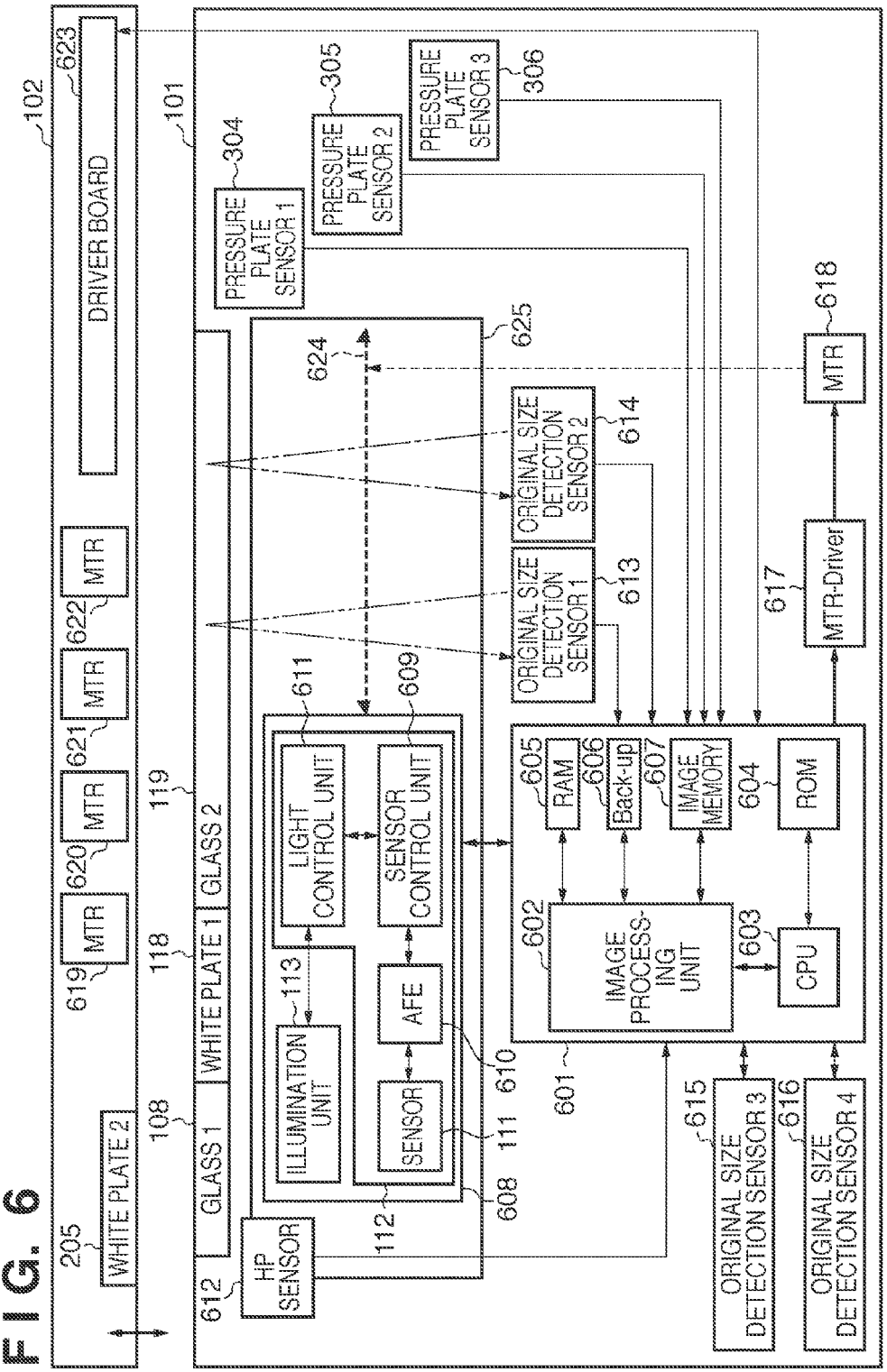
FIG. 6 is a diagram illustrating one possible configuration for implementing the present invention.

FIGS. 7A to 7H illustrate the dust detection described above with an example of dust information in a line memory provided in an image memory 606 (FIG. 6). Here, a position 701 shown in FIG. 7A indicates the position in memory space 702 corresponding to the original abutment position. On each of the right sides of FIGS. 7A to 7H showing memory states, the opening/closing states of the image reading apparatus 101 and the original conveying unit 102 at that time are shown.

Figure 7A:
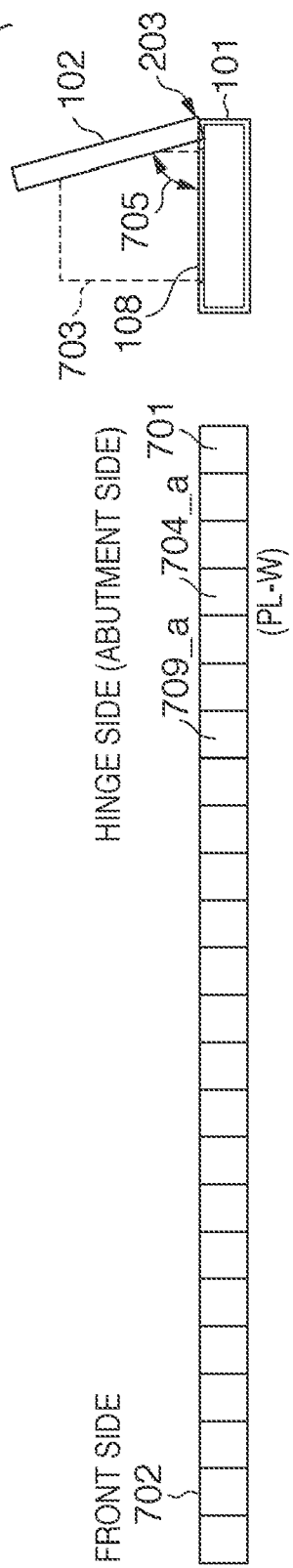
Figure 7B:
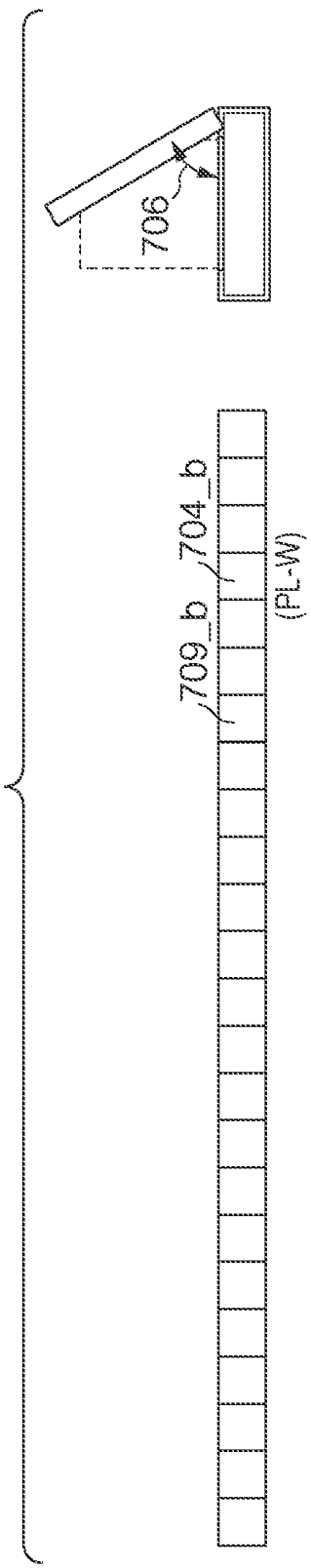

Space 703 in FIG. 7A indicates a space area that can be irradiated by the original illumination means. An opening angle (opening degree) 705 indicates the state where the original conveying unit 102 is opened to the maximum extent. A pixel position 704_a is the place where white dust on the platen glass 108 (PL-W) is adhering in this example. At the opening angle 705, the pressure plate sensor 304 has not detected anything, and thus means for reading dust, such as the line sensor 111 and the original illumination means 113, have not started. Accordingly, the white dust (PL-W) has not been detected yet. Similarly, although a pixel position 709_a is a place where black dust on the platen glass 108 (PL-B) is adhering, the black dust has not been detected yet. FIG. 7B shows the state just before the pressure plate sensor 304 is turned on, which is for detecting the start of closing the original conveying unit, and the opening angle of the original conveying unit 102 is 706, which is smaller than 705. Dust that is supposed to be at pixel positions 704_b and 709_b cannot be detected yet.

In FIG. 7C, the pressure plate sensor 304 is turned on so that the line sensor 111 is started, and moreover, control of light emission of the original illumination means 113 is performed, and the image reading means is completely started. At this time, although the opening angle of the original conveying unit 102 has become a still smaller opening angle 708, the white plate 205 cannot be read yet at this point in time. Specifically, as long as there is no dust on the platen glass, the luminance level detected by the line sensor 111 is extremely low, and white dust (at a position 704_c) on the platen glass 108 is detected. Because of the reasons described above, white plate dust at a pixel position 707 cannot be detected. Further, since the luminance of black dust is low, it is difficult to distinguish the black dust and the background in this state, and thus black dust at a pixel position 709_c cannot be detected either. Therefore, it can be determined that the image of the dust detected in this state is white dust on the platen glass.

FIG. 7D shows the state where an opening angle 711 of the original conveying unit 102 has become close to the depth of field at the original abutment position 701. White dust at a pixel position 704_d is detected at the same position, and black dust at a position 709_d cannot be determined as being dust since the luminance level difference from that of the surrounding pixels is smaller than a predetermined determination reference. Although a position 710 is a result of detecting dust on the white plate 205, the dust cannot be distinguished from black dust on the platen glass 108 at this time. Note that FIGS. 7A to 7H are mere examples for description, and thus may differ from the actual detection processing.

Figure 7F:
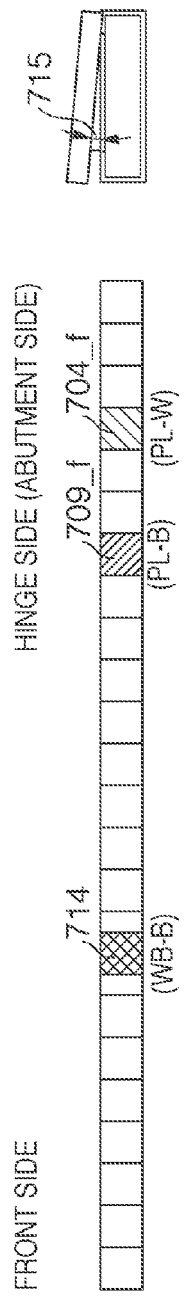
Figure 7G:
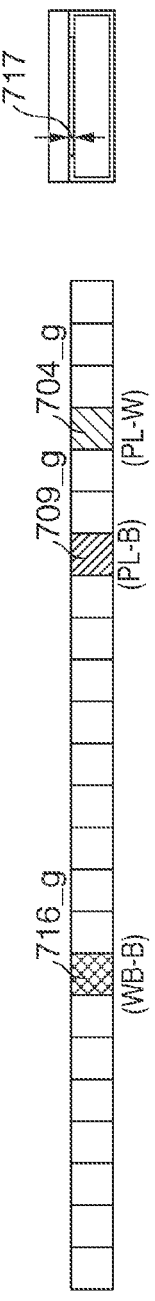
Figure 7H:
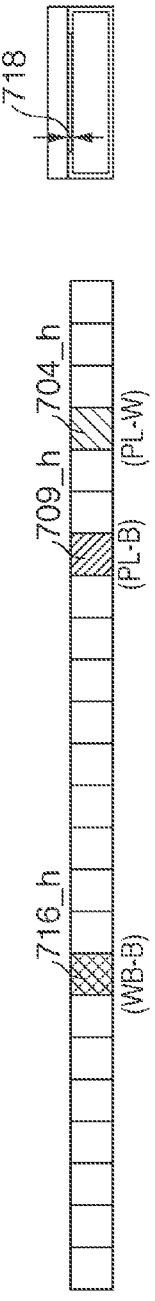

In FIG. 7E, an opening angle 713 of the original conveying unit 102 has become still smaller, and it is possible to distinguish between platen white dust at a position 704_e, and platen black dust at a position 709_e. The dust at the position 709_e is determined as being black dust on the platen, since black dust does not move. Moreover, it is determined that dust at a position 712 is dust on the white plate, since it moves from the position 710 in the direction opposite toward the abutment position. In FIG. 7F, an opening angle 715 of the original conveying unit 102 has become still smaller, and dust detection is mostly determined based on detection of platen white dust at a position 704_f, platen black dust at a position 709_f, and white plate dust at a position 714. In FIG. 7G, when an opening angle 717 of the original conveying unit 102 is in a state of being completely closed, platen white dust at a position 704_g, platen black dust at a position 709_g, and white plate dust at a position 716_g are detected almost completely. In FIG. 7H, which shows the state after a predetermined time has elapsed, at an opening angle 718 (that is, 717) of the original conveying unit 102, all the dust positions at 704_h, 709_h, and 716_h are determined.

Figure 8:
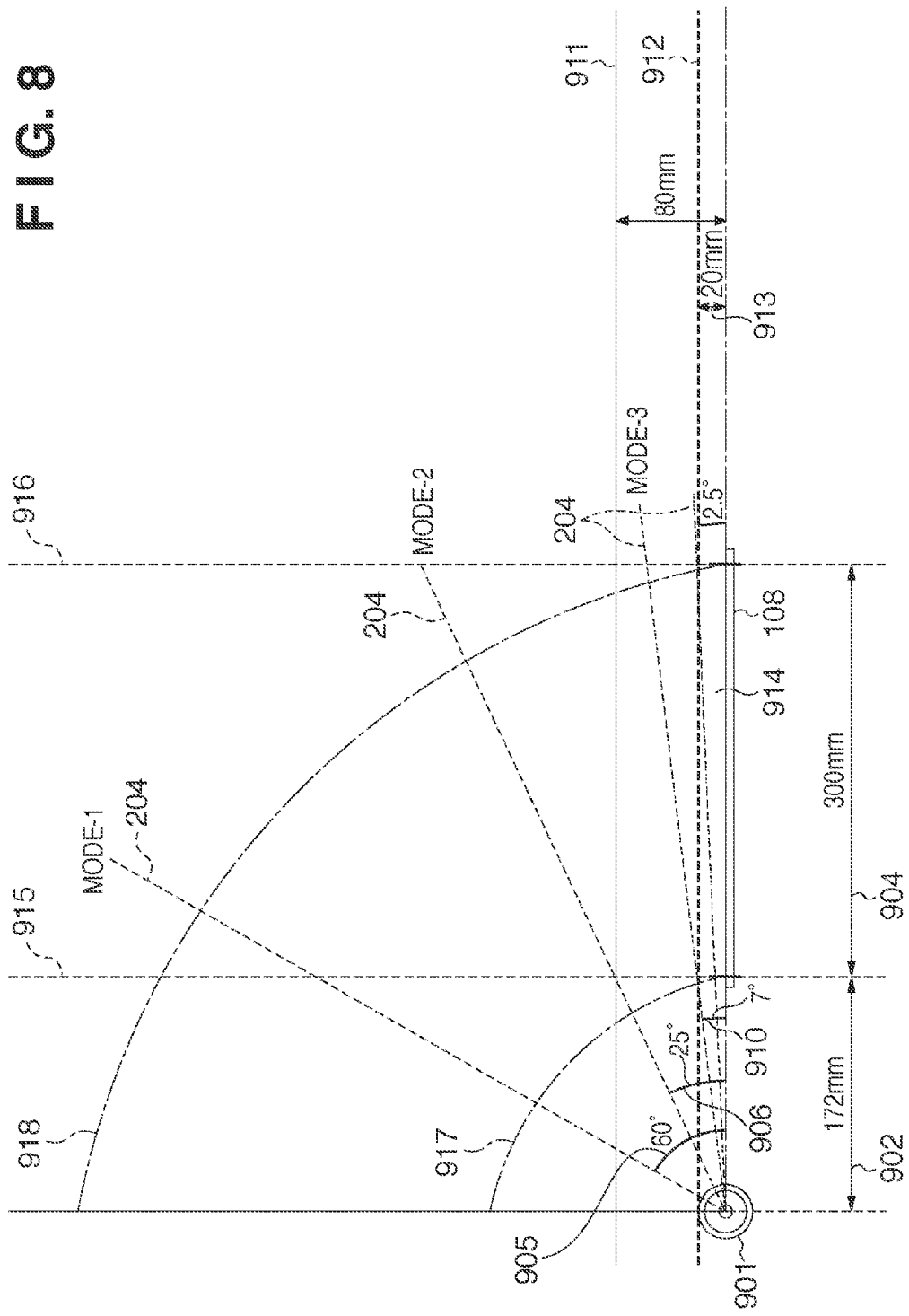
FIG. 8 is a diagram illustrating a cross section of an opening/closing mechanism of an original conveying unit.
Figure 9:
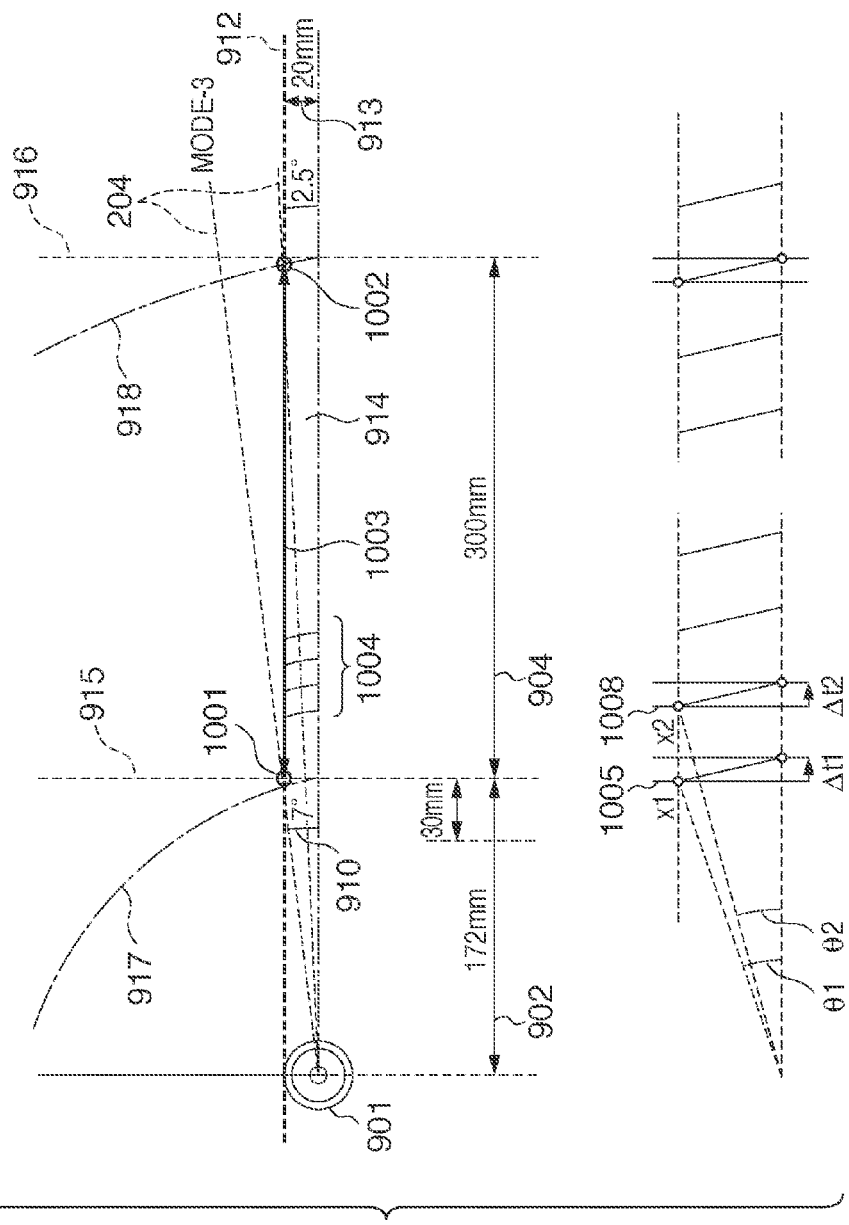
FIG. 9 is a diagram illustrating calculation of the amount of movement of dust detected at the upper limit of the depth of field (assumed to be 20 mm).

The above is a description of a method for detecting various types of dust, and a description is given with reference to FIGS. 8 and 9 regarding how much dust on the white plate arranged on the original conveying unit 102 actually moves. The approximate amount of movement is calculated based on the actual apparatus sizes, and thus a rotation cross-sectional view of the original conveying unit 102 shown in FIG. 8 has been created. A rotation center 901 is a rotation center of the original conveying unit 102 that rotates about the hinges 203.

A distance 902 indicates the distance from the rotation center 901 to the original abutment position of the platen glass 119 of the image reading apparatus 101, which is 172 mm in this example. Note that an original stacking portion of the original conveying unit 102 has a guide (not shown), and since originals are aligned at a center reference of the original stacking portion, the original carrying position is on the front side relative to the position reference of a book original. A distance 904 indicates the main scanning length of an original, which is 300 mm in this example. Arcs 917 and 918 are trajectories drawn, when the original conveying unit 102 is rotated, by the original abutment position and the original front side position, that is, the respective positions corresponding to both ends of the main scanning line in the state where the conveying unit is closed.

Further, vertical lines 915 and 916 are vertical lines set up from the original abutment position and the original front side position, respectively. The original conveying unit 102 can detect a dust detection mode according to the position where the opening/closing lever 202 is detected by the sensor. Examples of dust detection modes include MODE-1 (opening angle 906 (for example, 60 degrees)), MODE-2 (opening angle 908 (for example, 25 degrees)), and MODE-3 (opening angle 910 (for example, 7 degrees)). The opening angle of the original conveying unit 102 corresponding to the distance between the original front side position and the platen glass 108 being a depth of field 913 (for example, 20 mm) is 2.5 degrees in this example. The image reading apparatus according to the present embodiment is configured to be able to switch dust detection control for each opening angle. Note that MODE-1, MODE-2, and MODE-3 that have been described above are configured such that the sensors 304, 305, and 306 shown in FIGS. 3A to 3D are sequentially turned on according to the pushing amount of the opening/closing lever 202. Control is performed such that the pressure plate sensor 304 is turned on when the original conveying unit 102 is opened at the opening angle of 60°, next, the pressure plate sensor 305 is turned on at the opening angle of 25°, and the pressure plate sensor 306 is turned on at the opening angle of 7°. According to the sensor detection result, the dust detection mode (detection of white dust on the platen glass 108, detection of black dust thereon, detection of dust on the white plate 205) is executed. The pressure plate sensor 304 can also be called a first detection means, the pressure plate sensor 305 can also be called a second detection means, and the pressure plate sensor 306 can also be called a third detection means.

A horizontal line 912 indicates the depth of field that is at the distance of 20 mm from the upper surface of the platen glass 108. A white plate non-detection distance 911 indicates a white plate non-detection distance that is determined such that there is no detection of the white plate if it is positioned farther than this distance, in order to avoid variations in the results of detecting the white plate 205 of the original conveying unit 102, which is 80 mm in this example. That is, when operation in MODE-2 is started, the distance between the hinge side edge of the white plate 205 and the platen glass 108 is shorter than the white plate non-detection distance 911. Further, when operation in MODE-3 is started, the hinge side edge of the white plate 205 is within the depth of field. In view of this, in MODE-1, an operation of detecting white dust on the platen glass 108 is performed, which can be first detected in the state where the white plate 205 cannot be detected. In MODE-2, an operation of detecting black dust on the platen glass 108 that is determined based on the comparison with the result of detecting the white plate 205 is performed. In MODE-3, detection of dust on the white plate 205 is performed. In this case, a dust detection sequence is executed sequentially moving a position of interest from the position on the hinge 203 side, which reaches the depth of field earliest, to the edge on the opposite side along the main scanning line.

Although a temporary detection order is provided in dust detection, even if an operation of detecting black dust on the platen glass 108 that is executed in MODE-2 is performed in parallel with a white plate dust detecting operation in MODE-3, there is no difference in the detection results. Note that it is sufficient to use the original reading area as the target area where dust detection is actually performed. Accordingly, if dust detection control is executed in space 914 within the depth of field, dust detection control with respect to dust on the white plate and black dust on the platen glass can be realized. However, in terms of responsiveness, the detecting accuracy further improves if control is started to be performed in a larger space.

Examples of the amount of movement of dust calculated based on the actual measurement values are shown in FIG. 9. In FIG. 9, an area 1003 that extends about 300 mm away from an original abutment position 1001 in the main scanning direction is the target for detecting dust on the white plate 205 that can be detected at the depth of field of 20 mm in FIG. 8. The edge of the area 1003 opposite to the hinge is an edge 1002. As shown by sample points 1004, dust is detected at intervals of about 5 mm in this example. Positions 1005 and 1008 show dust assumption positions when dust on the white plate is at the distance of the depth of field of 20 mm from the platen glass upper surface due to the opening/closing operation of the original conveying unit. If each dust position (distance from the rotation center) is obtained, horizontal distances x1 and x2 from the rotation center 901 (distances to the vertical projection positions on the platen glass), and opening degrees (opening angles) Φ1 and Φ2 of the original conveying unit in each case can be calculated. Further, it is possible to obtain differences Δt1 and Δt2 between the distances from the rotation center to the dust positions on the white plate (that is, the horizontal distances when the original conveying unit is closed) and the distances x1 and x2. A table showing the relationship between the dust positions and the amount of movement calculated for intervals of 10 mm is shown in FIG. 11. Although the amount of movement changes depending on the designed value of a depth of field, after dust is detected, dust adhering onto the white plate 205 moves at least 10 pixels in almost all areas. Further, even dust at a position that is 480 mm away, which is the farthest from the rotation center, moves at least 8 pixels. Accordingly, using the fact that there is a difference of 8 pixels or more between the position where an image object corresponding to the dust is detected first after coming within the depth of field, and the position where it is detected last as a determination reference, white plate dust can be detected with higher precision.

Dust detection starts at earlier timings in an area closer to the abutment position where detection of dust on the white plate 205 starts in the state where the opening angle of the original conveying unit is large. However, in the actual sequence, since it is determined that the dust is on the white plate 205 by detecting that the dust does not move, all dust on the white plate will be determined collectively.

The above is a description of the outline of the present embodiment and operations performed therein, and one possible apparatus configuration for realizing the present invention is described below with reference to the block diagram shown in FIG. 6. In the image reading apparatus 101, a controller board 601, which is a control apparatus of the system, implements drive controlling and image processing. The controller board 601 is constituted as follows. When the system power supply is turned on, a CPU 603 reads a program from a ROM 604, and executes settings for an image processing unit 602. At the same time, various adjustment values unique to the apparatus are read from a backup memory 606 (non-volatile memory, such as an EEPROM). Then, an initial setting is performed with respect to a sensor control unit 609 included in an image read unit 608, and a driver board 623 that controls the driving of the original conveying unit 102. A RAM 605 is used for arithmetic processing when image processing is being executed, and an image memory 607 is a bulk memory that can execute writing and reading in original size units.

The image reading unit 608 is an electric unit block that accompanies the optical unit 110. The line sensor 111 is mounted on the line sensor board 112. The line sensor 111 operates in accordance with the driving conditions set by the sensor control unit 609. That is, when performing monochrome reading, the driving of a monochrome line sensor is controlled, and when performing color reading, the driving of R, G, and B line sensors is controlled. An AFE 610 includes functionality of a variable amplifier that converts analog output from the line sensor 111 into digital signals, a sample hold, and the like. This AFE 610 output is processed by the image processing unit 602, the resultant output is used when performing processing for shading correction, light distribution change correction, original size detection, and the like in accordance with a monochrome reading or color reading driving mode. If it is not used for original size detection, in order to detect the original width in the main scanning direction, original size detection sensors 615 and 616 are used. Further, a light control unit 611 performs constant current control with respect to the illumination units 113, and adjusts the amount of current supply such that constant current is always supplied to the white LEDs 1205, for example. Original size detection sensors 613 and 614 represent reflection type size detection sensors that detect the original sizes in the original lengthwise direction and the sub-scanning direction.

A motor driver (MTR-Driver) 617 controls the driving of an optical motor 618, and the movement of the image reading unit 608 that accompanies the optical unit 110. The optical unit 110 is provided with a flag (tabular member, for instance) (not shown) and, an HP sensor 612 detects the home position of the optical unit 110 by detecting that flag. When detection of the home position has been completed with the HP sensor 612, since the optical motor 618 is a stepping motor, it is possible to specify the position of the optical unit 110 based on the number of control pulses, using the home position as the starting point. The optical unit 110 is caused to scan in the sub-scanning direction at the starting time, and the home position is detected by the HP sensor 612. After that, the optical unit 110 moves just under the white plate (shading plate) 118 arranged at the platen glass 119 by moving a predetermined amount, and detects the white plate. Shading data (correction coefficient) is calculated based on the detection value. After that, the optical unit 110 moves under the platen glass 108, performs sampling of dust data with respect to the white plate 205 arranged on the facing surface without distinguishing between dust on the platen glass 108 and dust on the white plate 205, and waits. At this time, the movement of the optical unit 110 in the sub-scanning direction within the range of the width of the platen glass 108 is controlled, a position where a dust detection amount is small is set as a reading position for the sheet-through method (original flow reading).

The original conveying unit 102 is constituted by the paper feed motor 619, the conveying motor 620, a leading motor 621, a paper discharge/reverse motor 622, and the driver board 623 that processes information from a detection unit (sensor) for confirming driving of the motors and the conveying state of an original. Further, the pressure plate sensors 304, 305, and 306, which are controlled so as to be turned on/off by the opening/closing lever 202, are provided in order to detect the opening angle of the original conveying unit 102, which is opened/closed with the hinges 203.

Dust Detection Procedure

Figure 4B:
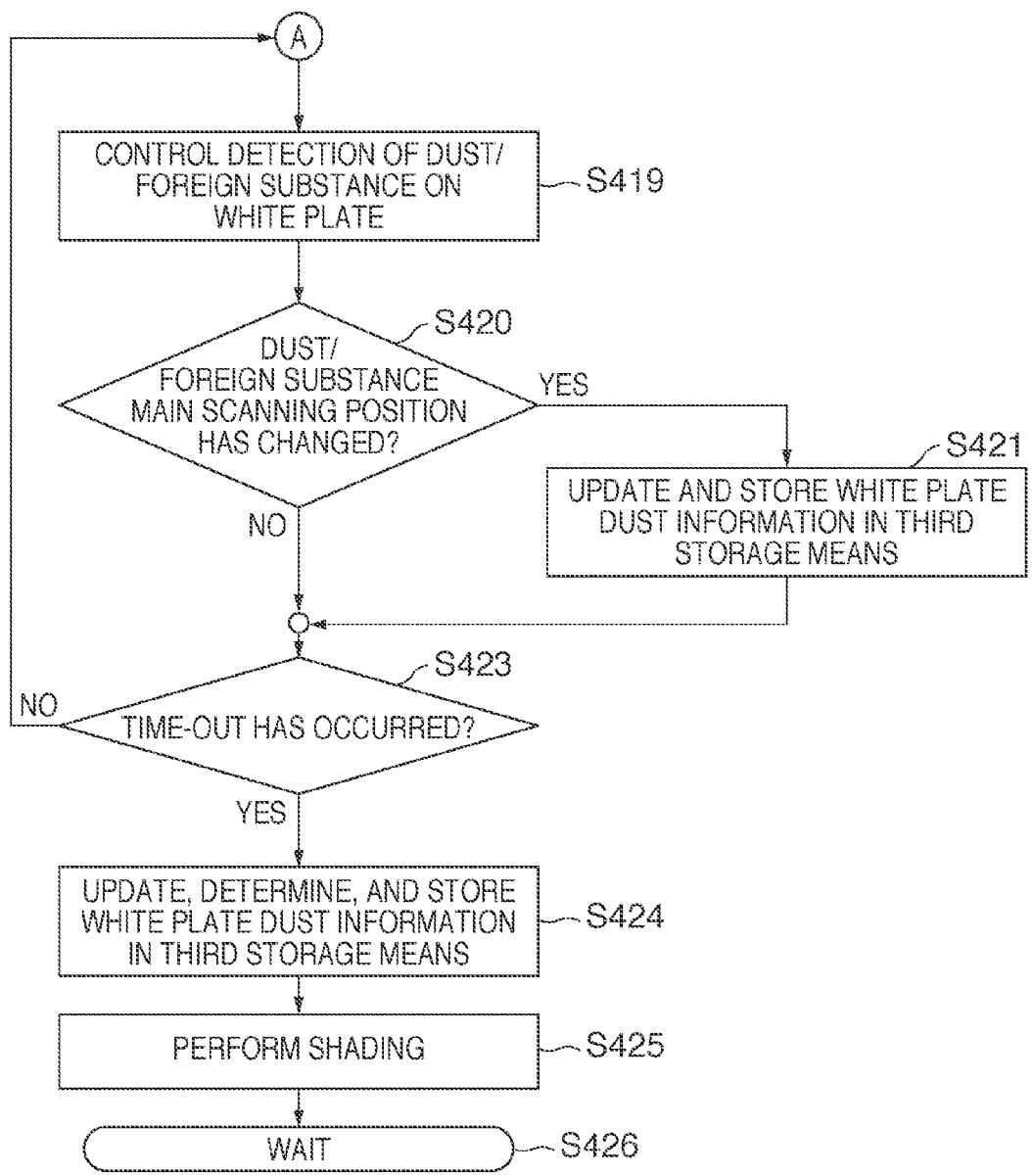

Next, a dust detection sequence and time series dust detection control are described, following steps in the flowchart shown in FIGS. 4A and 4B. FIGS. 4A and 4B show the flow of control performed by the CPU 603 that controls detection of white dust on the platen glass 108, black dust thereon, and dust on the white plate 205 using the detection results obtained by the pressure plate sensors 304, 305, and 306 that detect the opening/closing operation of the original conveying unit 102 as a trigger.

The dust detection start in S401 starts using the opening/closing operation of the original conveying unit 102 shown in S402 as a trigger. In determination in S404, it is determined whether the detection result obtained by the pressure plate sensor 304 indicates "detected (ON)", and if it indicates "not detected", the processing returns to S404. On the other hand, if it indicates "detected", control of light emission of the original illumination units 113, control of the driving of the line sensor 111, and initialization of other peripheral circuits are performed in S405. Note that the procedures shown in FIGS. 4A and 4B may be started from S405 using detection by the pressure plate sensor 304 as a trigger.

Next, in S407, detection of white dust on the platen glass 108 is started. The scanning of a dust image is executed from the abutment position toward the front side on the platen glass 108, and if it is determined in S408 that dust has been detected, white dust information is stored in a first storage means in S409. White dust information includes the position of a pixel determined as being dust. The same applies to the case of black dust, and also to the case of white plate dust. Note that the position of white plate dust is a pixel position where the image determined as being white plate dust was detected last in the white plate dust detection sequence. After that, the processing proceeds to S411. Further, if dust is not detected in S408, the processing directly proceeds to S411. In S411, an opening angle detection unit including the pressure plate sensor 305 for detecting the opening angle of the original conveying unit 102 determines whether a portion of the white plate 205 has reached the position within the white plate non-detection distance (80 mm from the platen glass).

In the determination in S411, if it is not detected that the pressure plate sensor 305 is turned on, the processing returns to S407, and the execution of white dust detection is continued. Further, if the pressure plate sensor 305 detects in S411 that the original conveying unit 102 has reached within the white plate non-detection distance, detection of black dust on the platen glass 108 is started in S413. If dust is detected in S414, black dust information is stored in a second storage means in S415, and the processing proceeds to S417. Further, if dust is not detected in S414, the processing directly proceeds to S417.

In S417, it is determined whether the pressure plate sensor 306, which is the opening angle detection unit for detecting the opening angle of the original conveying unit 102, is turned on. If it is not turned on, that is, the white plate 205 has not reached the depth of field (20 mm from the platen glass), the processing returns to S413, and the detection of black dust on the platen glass 108 is continued. On the other hand, if the pressure plate sensor 306 is turned on, that is, if it is detected that a portion of the white plate 205 has reached the depth of field, white plate dust detection control is started in S419. A timer is started at the same time.

White plate dust detection is started, and if it is detected in S420 that a dust position has changed, the white plate dust position is updated and stored in a third storage means in S421 of the flow, and the processing moves to S423. If dust is not detected in S420, the processing directly moves to S423. Next, in S423, it is determined whether a timer value (elapsed time) after the pressure plate sensor 306 is turned on does not exceed a predetermined time, that is, whether a time-out has occurred. If the predetermined time has not elapsed, the processing returns to S419, and the detection of dust on the white plate 205 is continued. Note that the predetermined time in S423 is assumed to be the upper limit of the time necessary for closing the original conveying unit 102 manually, in the ordinary case where the operator (worker) performs the operation of opening/closing the original conveying unit 102. Specifically, the predetermined time is set considering the time necessary for reliably closing the original conveying unit with some variations with respect to the time after the pressure plate sensor 306 is turned on, as a reference value. If a time-out has occurred in S423, determined white plate dust information is stored in the third storage means in S424.

Here, for confirming that the position of the dust image obtained when the white plate 205 is read moves, the line sensor 111 needs to read the entire surface of the white plate 205 a plurality of times while the original conveying unit 102 is being closed. Whether or not this is possible is determined depending on the time required to close the original conveying unit 102 and the reading intervals of the line sensor 111. If the resolution of the image reading apparatus 101 is 600 dpi, the line sensor 111 reads one main scanning at 105.83 μsec intervals. When the original conveying unit 102 is closed in the shortest time, a time of 30 msec is required to close the original conveying unit 102. The opening angle of the original conveying unit when the edge on the side farthest from the rotation axis reaches the depth of field is about 2.5 degrees (more specifically, 2.54 degrees) as shown in FIG. 8. It is possible of detect dust on the entire surface of the white plate 205 in this state. The time required to close the original conveying unit 102 completely from this state is about 1.1 msec. Since the scanning interval for one line of the line sensor 111 is 105.83 μsec, the line sensor 111 can read the entire surface of the white plate 205 at least 10 times while the original conveying unit is being closed. Thus, with the actual product, even if the original conveying unit is closed in the shortest time, the white plate can be read a plurality of times, and thus it is possible to detect the movement of a dust image.

FIG. 12 shows the relationship between PS (process speed) of the original conveying unit 102, that is, the original conveyance (movement) speed, with respect to the image reading apparatus 101 and the number of times that dust is detected. Here, it is assumed that the read resolution is 600 dpi, and a time for the original conveying unit 102 to rotate the angle of 2.54° is 10 msec. If the time required for rotating the angle of 2.54° is 10 msec, the time necessary for rotating 7°, that is, the time from when the mode transitions to MODE-3 until when the closing of the original conveying unit ends is 27.6 msec. Specifically, if a time-out time is set to 30 msec, it is possible to assure the number of times that dust is detected to the extent shown in FIG. 12, under the above conditions.

After detecting each dust information piece by performing processing in steps up to and including S424, with respect to positions of black dust and white dust on the platen glass 108, pixel data at the dust positions is interpolated using peripheral pixel information (neighborhood pixels), and shading correction is executed in S425. When shading correction is complete, a series of dust detection is complete in S426. In S425, if reading using the sheet-through method (original flow reading) is executed, using information regarding dust on the white plate 205 obtained by performing steps in the flow shown in FIGS. 4A and 4B, a shading coefficient for the position of dust on the white plate 205 is obtained by performing interpolation based on the shading coefficient for adjacent pixels, and substituted. When reading by performing fixed original reading, shading correction is performed using a correction coefficient obtained from the detection result of the white plate 118. In this way, image data on which dust removal processing has been performed is output.

Here, the following is a description of the principle of detection of dust on the platen glass in an organized manner. Specifically, in the states where the original conveying unit is opened at different opening angles (for example, the first opening angle and the second opening angle), an image is read with the optical unit. From the images corresponding to the respective different opening angles, which have been obtained by performing reading, images of a foreign substance are detected. If the detected images of the foreign substance are at corresponding positions on the images, the foreign substance of the images is detected as a foreign substance adhering to the platen glass. In this case, it is possible to estimate with high probability that the foreign substance adheres to the platen glass where its position is not influenced by the opening and closing of the original conveying unit. Then, for example, the position of the detected foreign substance is stored, and when performing image reading, the pixel corresponding to the position of the foreign substance of the read image can be interpolated and corrected using the neighborhood pixels thereof.

Further, the following is a description of the principle of detection of dust on the white plate. Specifically, in the states where the original conveying unit is opened at different opening angles (for example, the second opening angle and the third opening angle, since the white plate can desirably be detected), an image of the white plate is read with the optical unit. From the images corresponding to each of the different opening angles, which have been obtained by performing reading, images of a foreign substance are detected. If the detected images of the foreign substance are not at corresponding positions on the images, the foreign substance of the images is detected as a foreign substance adhering to the white plate. Desirably, it is determined whether or not the shift in the positions corresponds to the amount according to the difference of the opening angles, and if it corresponds to the amount according thereto, the foreign substance of the images is detected as a foreign substance adhering to the white plate, and thus detection can be performed with higher reliability. In this case, it is possible to estimate with high probability that the foreign substance adheres to the white plate where the position thereof is influenced by the opening and closing of the original conveying unit. Then, for example, the position of the detected foreign substance is stored, and when performing image reading, the pixel corresponding to the position of the foreign substance of the read image can be interpolated and corrected using the neighborhood pixels thereof.

In the present embodiment, through the processing described above, white dust on the platen glass can be detected. Further, it is possible to distinguish between dust on the platen glass and dust on the reference white plate attached to the original conveying unit. Accordingly, noise that occurred due to dust in image data can be removed using the method according to the cause thereof, and thus image data with high quality can be output.

Embodiment 2

Figure 5B:
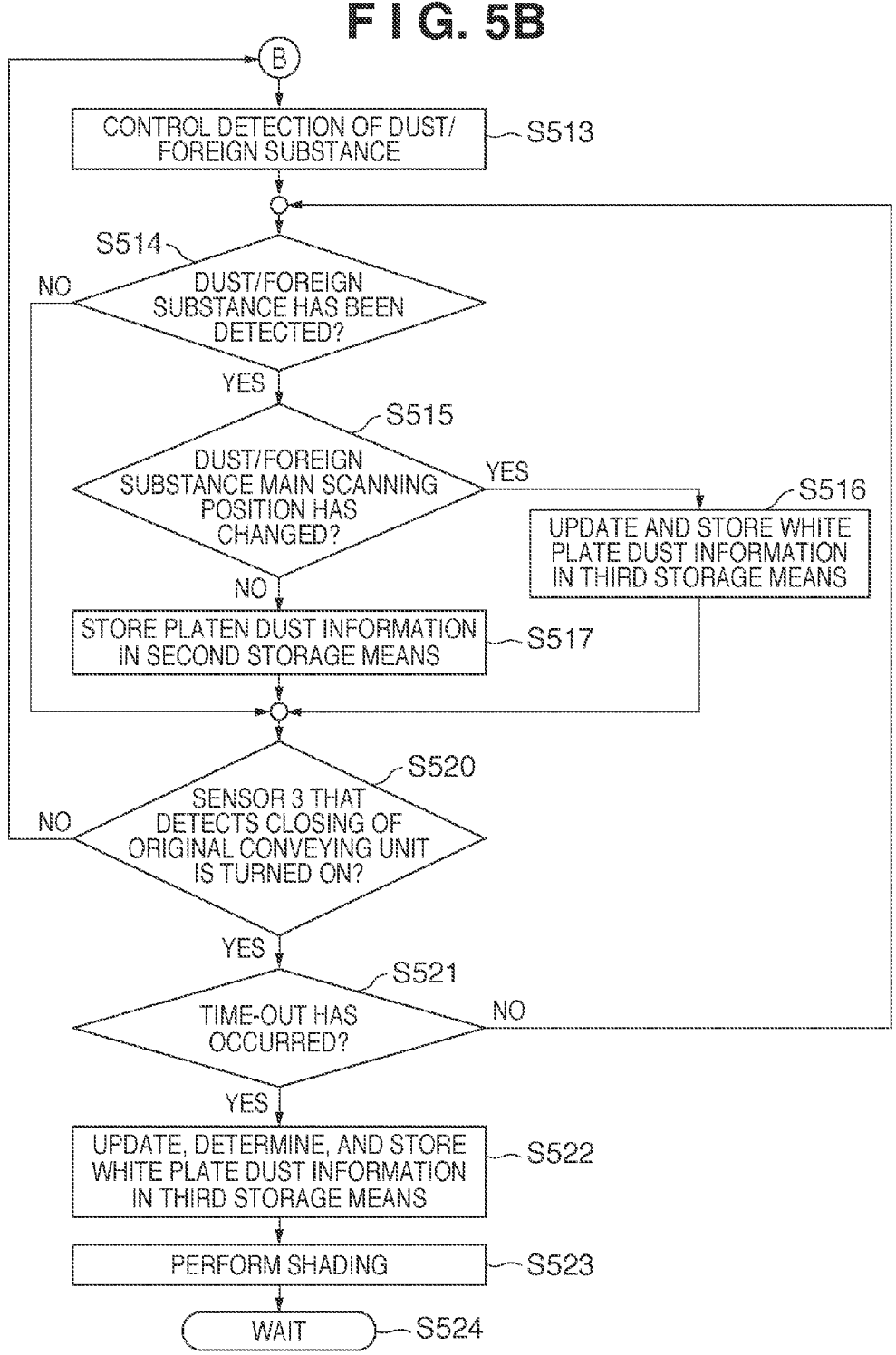

Next, parallel dust detection control is described following steps in the flowchart shown in FIGS. 5A and 5B. Similar to FIGS. 4A and 4B, FIGS. 5A and 5B show the flow of control performed by the CPU 603 that controls detection of white dust on the platen glass 108, black dust thereon, and dust on the white plate 205 using the detection results obtained by the pressure plate sensors 304, 305, and 306 that detect the opening/closing operation of the original conveying unit 102 as a trigger. In FIGS. 4A and 4B, a dust detection sequence is executed in the order of detection of white dust on the platen glass 108, black dust thereon, and dust on the white plate 205 of the original conveying unit 102, and dust detection results are determined in each sequence. In contrast to this, in FIGS. 5A and 5B, detection of black dust on the platen glass 108, and detection of dust on the white plate 205 of the original conveying unit 102 are executed in parallel processing. In this way, dust detection results are not determined until the original conveying unit 102 enters the state of being almost completely closed (detection time for each is set long), and thus dust detection accuracy is improved. The following is a description of the flow of dust detection control performed by the CPU 603.

Dust detection starts in S501 based on the opening/closing operation of the original conveying unit 102 shown in S502 as a trigger. In S504, if the detection result obtained by the pressure plate sensor 304 indicates "not detected", the processing returns to S504, and if it indicates "detected", control of light emission of the original illumination units 113, control of the driving of the line sensor 111, and initialization of other peripheral circuits are performed in S505.

In S507, detection of white dust on the platen glass 108 is started. The scanning is executed from the abutment position toward the front side on the platen glass 108, and if it is determined in S508 that dust has been detected, white dust information is stored in the first storage means in S509, and the processing proceeds to S511. Further, if dust is not detected in S508, the processing directly proceeds to S511, and using the pressure plate sensor 305 of the opening angle detection unit for detecting the opening angle of the original conveying unit 102, it is determined whether the white plate 205 has reached the white plate non-detection position.

In S511, if the pressure plate sensor 305 is not turned on, the processing returns to S507, and the execution of white dust detection is continued. Further, if the pressure plate sensor 305 is turned on, since the white plate 205 has reached the white plate non-detection position, detection of black dust on the platen glass 108 is started in S513. If dust is detected in S514, it is further determined whether the dust has moved in S515. If it is determined that the dust has moved, the processing proceeds to S516, and information regarding dust on the white plate 205 is updated and stored in the third storage means. If it is not detected in S515 that the dust has moved, the processing proceeds directly to S517, and information regarding black dust on the platen glass 108 is stored in the second storage means. If dust is not detected in S514, the processing moves to S520. In S520, if the pressure plate sensor 306, which is the opening angle detection unit for detecting the opening angle of the original conveying unit 102, is turned on (detected), the processing moves to S521, where it is determined whether the time that has elapsed after the pressure plate sensor 306 is turned on corresponds to a predetermined time (time for the original conveying unit to reliably transition to a closed state). If the elapsed time has not reached the predetermined time, the processing returns to S514, and the dust detection sequence is repeated.

In S521, if the time that has elapsed after detecting that the pressure plate sensor 306 is turned on exceeds the predetermined time (time-out), it is determined that the original conveying unit 102 is in the state of being completely closed, and the white plate dust information determined in S516 is stored in the third storage means in S522.

In the flow shown in FIGS. 5A and 5B, after detecting dust information pieces, with respect to positions of black dust and white dust on the platen glass 108, pixel data at the dust positions is interpolated using peripheral pixel information (neighborhood pixels), and in S523, shading correction is executed. The processing in S523 is the same as that in S425 shown in FIG. 4B.

In the present embodiment, white dust on the platen glass can be detected through the processing described above. Further, it is possible to distinguish between dust on the platen glass and dust on the reference white plate attached to the original conveying unit. Accordingly, noise that occurred due to dust in image data can be removed using the method according to the cause thereof, and thus image data with high quality can be output.

Although color information is not described in the above description, in the case of reading color image data, similar processing can be performed following the procedure described above for each color component. Specifically, the colors of line sensors respectively detect images of dust, and perform correction for each color component. In this way, the same effects can be obtained with a monochrome line sensor, or with color line sensors.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-137722, filed Jun. 8, 2009, which is hereby incorporated by reference herein in its entirety.

What is claimed is:

1. An image reading apparatus that reads an original that is conveyed on a platen glass using an optical unit including a line sensor and an imaging optical system, the image reading apparatus comprising:
    an opening/closing member that can be opened and closed about a rotation axis that is orthogonal to a lengthwise direction of the line sensor;
    a white member provided on the opening/closing member, the white member facing the optical unit; and
    a detecting unit that detects images of a foreign substance from a plurality of images obtained by the optical unit reading the white member, the plurality of images being obtained respectively in a plurality of states where the opening/closing member is opened at a plurality of opening angles,
    wherein the detecting unit detects the foreign substance as a foreign substance adhering to the platen glass in a case where the images of the foreign substance detected from the plurality of images are at the same position.

2. The image reading apparatus according to claim 1, wherein,
    in a case where the images of the foreign substance detected from the plurality of images are at different positions, the detecting unit detects the foreign substance as a foreign substance adhering to the white member.

3. The image reading apparatus according to claim 1, further comprising an opening angle sensor that detects an opening angle of the opening/closing member,
    wherein the detecting unit detects an image of a foreign substance from an image obtained by the optical unit reading the white member when the opening angle sensor detects a predetermined opening angle.

4. An image reading apparatus that reads an original that is conveyed on a platen glass using an optical unit including a line sensor and an imaging optical system, the image reading apparatus comprising:
    an opening/closing member that can be opened and closed about a rotation axis that is orthogonal to a lengthwise direction of the line sensor;
    a white member provided on the opening/closing member, the white member facing the optical unit; and
    a detecting unit that detects images of a foreign substance from a plurality of images obtained by the optical unit reading the white member, the plurality of images being obtained respectively in a plurality of states where the opening/closing member is opened at a plurality of opening angles,
    wherein the detecting unit detects the foreign substance as a foreign substance adhering to the white member in a case where the images of the foreign substance detected from the plurality of images are at different positions.

5. The image reading apparatus according to claim 4, further comprising an opening angle sensor that detects an opening angle of the opening/closing member,
    wherein the detecting unit detects an image of a foreign substance from an image obtained by the optical unit reading the white member when the opening angle sensor detects a predetermined opening angle.

* * * * *